United States Patent Office 3,466,323
Patented Sept. 9, 1969

3,466,323
LOW MOLECULAR WEIGHT LINEAR
THIODIPROPIONIC POLYESTERS
Clarence E. Tholstrup, Alan Bell, and Charles J. Kibler, Kingsport, Tenn., assignors to Eastman Kodak Company, Rochester, N.Y., a corporation of New Jersey
No Drawing. Continuation-in-part of application Ser. No. 309,339, Sept. 16, 1963. This application Dec. 13, 1965, Ser. No. 513,593
Int. Cl. C07c 149/26, 149/00
U.S. Cl. 260—481                    2 Claims

ABSTRACT OF THE DISCLOSURE

Low molecular weight polyesters useful as stabilizers for organic materials and prepared by condensing a thiodipropionic acid or ester thereof with a diprimary sterically hindered glycol with a chain terminating agent.

---

This application is a continuation-in-part of our copending application Ser. No. 309,339, filed Sept. 16, 1963, now abandoned, which in turn is a continuation-in-part of our copending application, Ser. No. 77,862, filed Dec. 23, 1960, now U.S. Patent No. 3,157,517, granted on Nov. 17, 1964.

This invention relates to novel low molecular weight linear polyesters of thiodipropionic acid condensed with a diprimary sterically hindered glycol, which polyesters can be optionally terminated with a monofunctional alcohol or carboxylic acid. These polyesters are superior stabilizers (antioxidants) for organic materials subject to oxidative and other types of deterioration.

It is an object of this invention to provide novel polyesters which are useful as antioxidants in normally oxidizable organic materials. It is a further object to provide novel polyesters which can be employed both as plasticizers and as antioxidants in synthetic resins. It is another object to provide novel polyesters which when used together with phenolic antioxidants, are effective as stabilizers in organic materials, and in fact, cause a cumulative or synergistic antioxidant effect which is substantially more than the sum of the antioxidant effect of each when used separately.

It is accordingly an object of this invention to provide a new class of antioxidants which are useful for other purposes, besides being antioxidants, such as being useful as plasticizers whereby a surprisingly valuable dual function can be achieved.

Other objects will become apparent hereinafter.

The novel complex polyesters of this invention are characterized by a lower molecular weight than that of the so-called polythioesters. For best results, the molecular weight should be no greater than about 4,000. The complex polyesters can be prepared by reacting 3,3'-thiodipropionic acid or its esters with diprimary sterically hindered glycols and, optionally, with monobasic acids or alcohols.

Suitable diprimary sterically hindered glycols that can be employed in the preparation of the polyesters of the invention are selected from the group consisting of neopentyl glycol; 2,2-diethylpropanediol-1,3; 2-ethyl-2-butyl-propanediol-1,3; 2-ethyl-2-propylpropanediol-1,3; 2-ethyl-2-methylpropanediol-1,3; 1,1-cyclohexanedimethanol; 1,2-cyclohexanedimethanol; 1,3-cyclohexanedimethanol; and 1,4-cyclohexanedimethanol.

Of these, the preferred glycols are those selected from the group consisting of 1,1-cyclohexanedimethanol; 1,2-cyclohexanedimethanol; 1,3-cyclohexanedimethanol; and 1,4-cyclohexanedimethanol, since polyesters prepared from these glycols have been found to be the most effective stabilizers.

Diprimary sterically hindered glycols are used to prepare the polyesters of the invention since they have better thermal and hydrolytic stability than polyesters prepared from other glycols. Hydrolytic stability is an important property in a stabilizer since if a material hydrolyzes, then it could be lost through leaching or volatilization and thus become an ineffective stabilizer. Thermal stability is an important property in a stabilizer since many polymer fabrication steps involve heat and a material which degrades upon heating is an ineffective stabilizer.

Polyesters prepared from neopentyl glycol and thiodibutyric acid are shown in British Patent 588,833. However, polyesters of thiodibutyric acid are ineffective stabilizers as will be shown hereinafter, and polyesters prepared from thiodipropionic acid are vastly superior which is a surprising and unexpected result.

Methods for making the complex polyesters of this invention are well known. For example, $n+1$ moles of the thiodipropionic acid or ester thereof can be reacted with $n$ moles of a diprimary sterically hindered glycol (where $n$ is an integer greater than 1) using any of the ester interchange catalysts known to the art. Of course, the ratio of reactants can be altered to produce complex polyesters of various molecular weights.

To produce the novel low molecular weight complex polyesters of the invention, an appropriate chain-terminating agent can be used, for example, a monobasic carboxylic acid, its ester or anhydride, or a monohydric alcohol or substituted alcohol. Examples of alcohols which may be so used are methanol; ethanol; butanol; isobutanol; 2-ethylhexanol; 2,2 - dimethylpentanol; 2,2,4 - trimethylpentanol; stearyl alcohol; etc. Examples of acids which can be used in a similar manner as acids or in their anhydride form are acetic acid, butyric acid, isobutyric acid, lauric acid, oleic acid, stearic acid, pelargonic acid, benzoic acid, etc.

Although in many cases it may be preferable to terminate the polyesters of this invention with monofunctional alcohols or acids, the unterminated polyesters are also useful and are within the scope of this invention. Polyesters which are at least 50% terminated have been found to be easily produced in commercial quantities and are substantially equivalent in properties to fully terminated polyesters.

Complex polyesters of the desired molecular weight can be obtained by varying the conditions of the reaction and the amounts of the reactants as is more specifically illustrated by the examples given hereinafter.

Specific organic materials which can be stabilized with the antioxidants of this invention include fatty oils and fats such as lards, waxes, cotton seed oil, corn oil, peanut oil and citrus oils, fatty acids, glycerides, vitamin compositions and the like. See the parent application, Ser. No. 77,862, now U.S. Patent No. 3,157,517 which contains claims covering the stabilization of fats, fatty oils and related substances.

Other materials which can be stabilized include synthetic and natural resins, cellulose esters, hydrocarbons including waxes, oils and fuels, polymeric compositions whether resinous or not, etc. See for example our copending application Ser. No. 77,863, now abandoned, filed Dec. 23, 1963, which relates to stabilizing poly-α-olefins. Refer also to Kibler et al. Ser. No. 166,155, now U.S. Patent No. 3,233,176, filed Jan. 15, 1962, which describes, as stabilizers in elastomeric polymers, the employment of polyesters of the type defined herein. Reference is also invited to Bell et al. Ser. No. 186,196, now U.S. Patent No. 3,277,060 filed Apr. 9, 1962, as regards using the polyesters of the present invention to facilitate the manufacture of resinous polyesters.

The preparation of typical compounds and compositions embodying this invention is illustrated by the following examples. Others which come within the scope of the invention can be prepared in a similar manner, and it is not intended that the invention should be limited to these specific compounds and compositions set forth in the following examples which are provided for purposes of illustration.

Example 1.—Preparation of polyester of 3,3'-thiodipropionic acid and neopentyl glycol, molecular weight 669

A mixture of 267 g. (1.5 moles) of 3,3'-thiodipropionic acid, 96.7 g. (0.93 mole) of neopentyl glycol and 201 g. (1.73 moles) of 2,2-dimethylpentanol containing 0.4 ml. of titanium tetraisopropoxide was placed in a two-liter, three-necked flask. The flask was fitted with a stirrer and a two-feet packed column terminating in a vacuum still head and receiver. The mixture was heated with stirring under the conditions given in the following table:

| Time, hr. | Temp., °C. | Pressure, mn. Hg | Water collected, ml. | Acid No. |
|---|---|---|---|---|
| 8 | 124–150 | 200 | 38 | |
| 14 | 150–170 | 200–95 | 53.5 | 3.30 |
| 38 | 170 | 95 | 1 55 | 0.28 |
| 66 | 170 | 82 | | 0.25 |
| 90 | 170 | 1.0 | | |

¹ 3 moles.

As water was formed, it was removed by distillation and collected in the receiver. After the acid number had reached 0.25, the column was removed, the pressure was dropped to 1 mm., and the excess 2,2-dimethylpentanol and any other volatiles were removed by distillation.

The light colored liquid was cooled, and 5 g. of a diatomaceous silica filter aid and 50 ml. of water were added. This was refluxed for 3 hours with stirring to convert the titanium alkoxide catalyst to inert $TiO_2$. The mixture was filtered by suction to remove the $TiO_2$ and filter aid and the filtrate dried at 110° C. under vacuum. The polyester had a molecular weight of 669, determined by the boiling point elevation in benzene.

Example 2.—Preparation of polyester of 3,3'-thiodipropionic acid and neopentyl glycol, molecular weight 1,106

A polyester was prepared by the procedure of Example 1 above except that the ratios of reactants were altered to permit the formation of a product of higher molecular weight. 267 g. (1.5 moles) of 3,3'-thiodipropionic acid, 125 g. (1.2 moles) of neopentyl glycol and 139 g. (1.2 moles) of 2,2-dimethylpentanol were used. The molecular weight of the liquid polyester was 1,106.

Example 3.—Preparation of polyester of 3,3'-thiodipropionic acid and neopentyl glycol, molecular weight 1,445

A polyester was prepared in accordance with Example 1 with the exception that the proportions of the reactants were altered to obtain a product of a still higher molecular weight. 1.5 moles of 3,3'-thiodipropionic acid, 1.5 moles of neopentyl glycol, and 0.6 mole of 2,2-dimethylpentanol were used. The viscous liquid produced had a molecular weight of 1,445.

Example 4.—Preparation of polyester of 3,3'-thiodipropionic acid and 1,4-cyclohexanedimethanol, molecular weight 767

A polyester was prepared by the procedure of Example 1 except that 267 g. (1.5 moles) of thiodipropionic acid, 134 g. (0.93 mole) of 1,4-cyclohexanedimethanol and 225 g. (1.73 moles) of 2-ethylhexanol were used. In this case 4.0 ml. of a 10% solution of

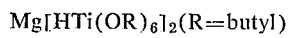

$Mg[HTi(OR)_6]_2 (R=butyl)$ in butanol were used as catalyst. The product was a clear yellow viscous oil of molecular weight 767. It had an acid number of 0.10 and a hydroxyl number of 1.13.

Example 5.—Preparation of polyester from 3,3'-thiodipropionic acid, 1,4-cyclohexandimethanol and stearyl alcohol This polyester with a molecular weight of about 2000 was prepared by refluxing a mixture of 5.0 moles (890 g). of 3,3'-thiodipropionic acid, 5.0 moles (720 g.) of 1,4-cyclohexanedimethanol (70% trans), 1 mole (270 g.) stearyl alcohol, 250 ml. of xylene and 2.0 ml. of titanium isopropoxide under nitrogen about 16 hours. During this time the reaction mixture was stirred. At the end of this time the acid number was 0.14. To the mixture was then added 50 g. of silica filter aid, 20 g. of activated charcoal, 100 ml. of water and 1 liter of xylene. This mixture was stirred and refluxed for 1 hour and was then filtered through silica filter aid. The solvent was stripped under vacuum to a final base temperature of 150–160° C. at 2 mm. to give about 1500 g. of soft sticky wax, M.W. 1900–2100. A portion of the molecules of this polyester have molecular weights ranging upwards of 2100 and probably above 3500.

Example 6.—Preparation of polyester of 3,3'-thiodipropionic acid, 1,4-cyclohexanedimethanol and tridecyl alcohol, molecular weight 1200

A mixture of 89 g. (0.5 mole) of 3,3'-thiodipropionic acid, 72 g. (0.5 mole) of 1,4-cyclohexanedimethanol, 40 g. (0.2 mole) of tridecyl alcohol, 79 ml. of xylene and 0.2 ml. of titanium isopropoxide was placed in a flask fitted with a stirrer, a thermometer and a water separator. This mixture was stirred and heated at 146–151° C. under nitrogen for 7 hours. After cooling, the mixture was diluted with 100 ml. of toluene and to this was added 5 g. of Filter-Cel filtering aid, 5 g. of Darco G–60 carbon black and 30 ml. of water. This mixture was boiled for 1 hour, filtered while hot and the filtrate was stripped under vacuum to a final temperature of 150° C. at 1 mm. pressure. The resulting white soft waxy polymer had a M.W. of 1200, an acid number of 0.21 and a hydroxyl analysis of 1.58%.

Example 7.—Preparation of polyester of 3,3'-thiodipropionic acid, 1,4-cyclohexanedimethanol and stearyl alcohol, molecular weight 2200

A polymer was prepared from 89 g. (0.5 mole) of 3,3'-thiodipropionic acid, 72 g. (0.5 mole) of 1,4-cyclohexanedimethanol and 27 g. (0.1 mole) of stearyl alcohol using the procedure of Example 6. The white waxy polymer had a M.W. of 2200, an acid number of 0.52 and a hydroxyl analysis of 1.09%.

Example 8.—Preparation of polyester of 3,3'-thiodipropionic acid, 1,4 - cyclohexanedimethanol and stearyl alcohol, molecular weight 2700

Using the procedure described in Example 6, a polyester was prepared from 78.5 g. (0.44 mole) of 3,3'-thiodipropionic acid, 63.5 g. (0.44 mole) of 1,4-cyclohexanedimethanol and 13.5 g. (0.05 mole) of stearyl alcohol. The white waxy polymer had a M.W. of 2700, an acid number of .40, and a hydroxyl analysis of 0.92%.

Example 9.—Preparation of fully terminated polyesters of 3,3'-thiodipropionic acid, 1,4-cyclohexanedimethanol and stearyl alcohol, molecular weight 1900

A polymer was prepared as in Example 6, except using a reaction time of 40 hours, from 133.5 g. (0.75 mole) of 3,3'-thiodipropionic acid, 89 g. (0.62 mole) of 1,4-cyclohexanedimethanol and 67.5 g. (0.25 mole) of stearyl alcohol. The resulting white waxy polymer had a M.W. of 1900, an acid number of less than 0.1. No hydroxyl termination could be detected.

Example 10.—Preparation of polyester of 3,3'-thiodipropionic acid, 1,3-cyclohexanedimethanol and stearyl alcohol, molecular weight 1500

Using the same procedure as in Example 6, a polyester was prepared from 44.5 g. (0.25 mole) of 3,3′-thiodipropionic acid, 32.5 g. (0.22 mole) of 1,3-cyclohexanedimethanol and 27 g. (0.1 mole) of stearyl alcohol. The resulting white waxy polymer had a M.W. of 1500, an acid number of 0.43, and a hydroxyl analysis of 1.65%.

Example 11.—Preparation of polyester of 3,3′-thiodipropionic acid, 1,2-cyclohexanedimethanol and stearyl alcohol, molecular weight 1450

Using the procedure of Example 6, a polyester was prepared from 44.5 g. (0.25 mole) of 3,3′-thiodipropionic acid, 32.5 g. (0.22 mole) of 1,2-cyclohexanedimethanol and 27 g. (0.1 mole) of stearyl alcohol. The resulting white waxy product had a M.W. of 1450, an acid number of 0.82 and a hydroxyl analysis of 1.71%.

Example 12.—Preparation of polyester of 3,3′-thiodipropionic acid, 1,1-cyclohexanedimethanol, and stearyl alcohol, molecular weight 1600

A polymer was prepared from 44.5 g. (0.25 mole) of 3,3′-thiodipropionic acid, 32.5 g. (0.25 mole) of 1,1-cyclohexanedimethanol and 27 g. (0.1 mole) of stearyl alcohol using the procedure of Example 6. The polyester was obtained as a white waxy polymer having a M.W. of 1600, an acid number of 0.67 and a hydroxyl analysis of 1.61%.

Example 13.—Preparation of polyester of 3,3′-thiodipropionic acid, 2 - butyl - 2 - ethyl - 1,3 - propanediol and stearyl alcohol, molecular weight 1100

A polyester was prepared from 89 g. (0.5 mole) of 3,3′-thiodipropionic acid, 80 g. (0.5 mole) of 2-butyl-2-ethyl-1,3-propanediol and 54 g. (0.2 mole) of stearyl alcohol using the procedure of Example 6, except that the heating time was increased to 20 hours. The resulting white waxy polymer had a M.W. of 1100, an acid number of 0.43 and a hydroxyl analysis of 1.76%.

Example 14.—Preparation of polyester of 3,3′-thiodipropionic acid, 2 - ethyl - 2 - propyl - 1,3 - propanediol and stearyl alcohol, molecular weight 1550

Using the same procedure as Example 13, a polyester was prepared from 44.5 g. (0.5 mole) of 3,3′-thiodipropionic acid, 30 g. (0.22 mole) of 2-ethyl-2-propyl-1,3-propanediol and 27 g. (0.1 mole) of stearyl alcohol. The resulting polyester was a white waxy polymer, M.W. 1550, acid number 0.55, and hydroxyl analysis 1.75%.

Example 15.—Preparation of polyesters of 3,3′-thiodipropionic acid, 2 - ethyl - 2 - methyl - 1,3 - propanediol and stearyl alcohol, molecular weight 2300

A polyester was prepared as in the procedure of Example 13 using 89 g. (0.5 mole) of 3,3′-thiodipropionic acid, 59 g. (0.5 mole) of 2-ethyl-2-methyl-1,3-propanediol and 27 g. (0.1 mole) of stearyl alcohol. The white waxy polyester had a M.W. of 2300, an acid number of 0.45 and a hydroxy analysis of 1.01%.

To show the superiority of polyesters prepared from 3,3′-thiodipropionic acid over 4,4′-thiodibutyric acid, the following polyester was prepared:

Example 16.—Preparation of polyester of 4,4′-thiodibutyric acid, 1,4-cyclohexanedimethanol and stearyl alcohol, molecular weight 1400

A polyester was prepared from 51.5 g. (0.25 mole) of 4,4′-thiodibutyric acid, 32.5 g. (0.25 mole) of 1,4-cyclohexanedimethanol and 27 g. (0.1 mole) of stearyl alcohol, using the procedure of Example 6. The resulting polymer was a soft white wax, M.W. 1400, acid number 0.35, and hydroxyl analysis 1.77%.

Data is presented in the following table which shows that polyesters prepared from 3,3′-thiodipropionic acid are superior to polyesters prepared from 4,4′-thiodibutyric acid.

TABLE

| Test | Polypropylene + the following additives | 160° C. oven life (hrs.) |
|---|---|---|
| 1 | None | <0.5 |
| 2 | 0.1% Santowhite powder +0.1% polyester of Example 7. | 250 |
| 3 | 0.1% Santowhite powder +0.1% polyester of Example 16. | 40 |

From the data in the table, it is readily seen that polyesters from 3,3′-thiodipropionic acid have a thermal stability of over six times that of polyesters of 4,4′-thiodibutyric acid.

Although the invention has been described in considerable detail with particular reference to certain preferred embodiments thereof, variations and modifications can be effected within the spirit and scope of the invention as described hereinbefore.

We claim:

1. A polyester having the following repeating unit

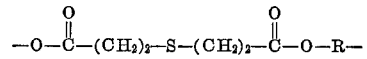

wherein R is selected from the group of divalent radicals consisting of 1,1-cyclohexanedimethylene; 1,2-cyclohexanedimethylene; 1,3-cyclohexanedimethylene; and 1,4-cyclohexanedimethylene; said polyester being at least partially chain-terminated with a compound which is an alcohol selected from the group consisting of methanol; ethanol; butanol; isobutanol; 2-ethylhexanol; 2,2-dimethylpentanol; 2,2,4-trimethylpentanol; and stearyl alcohol; and said polyester having an average molecular weight of from about 500 to about 4000.

2. A polyester according to claim 1 wherein R is a 1,4-cyclohexanedimethylene radical and said chain-terminating compound is stearyl alcohol.

References Cited

UNITED STATES PATENTS 2,575,196   11/1951   Smith _____ 260—481
Re. 24,287   3/1957   Smith _____ 260—481 XR

FOREIGN PATENTS 883,419   7/1943   France.

JAMES A. PATTEN, Primary Examiner

E. GLEIMAN, Assistant Examiner

U.S. Cl. X.R.

99—11, 150, 163; 252—406; 260—45.7, 236.6, 410.6